US012386315B2

(12) United States Patent
Maruyama et al.

(10) Patent No.: US 12,386,315 B2
(45) Date of Patent: Aug. 12, 2025

(54) CASE AND TIMEPIECE

(71) Applicant: CASIO COMPUTER CO., LTD., Tokyo (JP)

(72) Inventors: Yoshihiro Maruyama, Hamura (JP); Masakuni Iwanaga, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 968 days.

(21) Appl. No.: 17/504,748

(22) Filed: Oct. 19, 2021

(65) Prior Publication Data

US 2022/0035316 A1 Feb. 3, 2022

Related U.S. Application Data

(63) Continuation of application No. 16/574,153, filed on Sep. 18, 2019, now Pat. No. 11,181,866.

(30) Foreign Application Priority Data

Oct. 4, 2018 (JP) ................................ 2018-189354

(51) Int. Cl.
*G04B 37/08* (2006.01)
*G04B 37/00* (2006.01)
(Continued)

(52) U.S. Cl.
CPC ........ *G04B 37/084* (2013.01); *G04B 37/0008* (2013.01); *G04B 37/08* (2013.01);
(Continued)

(58) Field of Classification Search
CPC .. G04B 37/084; G04B 37/0008; G04B 37/08; G04B 37/22; G04D 3/0064; G04D 3/0069
See application file for complete search history.

(56) References Cited

U.S. PATENT DOCUMENTS 3,940,922 A * 3/1976 Miyasaka ............ G04B 37/083
968/295
5,923,622 A * 7/1999 Chung ................. G04B 19/286
368/309
(Continued)

FOREIGN PATENT DOCUMENTS

DE 4106151 A1 * 11/1991 ........... B23K 26/361
JP S57-108688 A 7/1982
(Continued)

OTHER PUBLICATIONS

WO2017109674—translation (Year: 2024).*
(Continued)

*Primary Examiner* — Elizabeth M Kerr
*Assistant Examiner* — Keith Brian Assante
(74) *Attorney, Agent, or Firm* — SCULLY SCOTT MURPHY & PRESSER, PC

(57) ABSTRACT

A case includes a main case body and an exterior member. The exterior member is welded to the main case body with laser light. The laser light is irradiated onto an irradiation surface. A welding part of the main case body and the exterior member is formed on the inner periphery surface extending along a height direction of the case and is formed such that the irradiation surface is perpendicular to the incident laser light.

21 Claims, 6 Drawing Sheets

(51) Int. Cl.
*G04B 37/22* (2006.01)
*G04D 3/00* (2006.01)

(52) U.S. Cl.
CPC ........... *G04B 37/22* (2013.01); *G04D 3/0064* (2013.01); *G04D 3/0069* (2013.01)

(56) References Cited

U.S. PATENT DOCUMENTS

| | | | | |
|---|---|---|---|---|
| 2005/0136284 | A1* | 6/2005 | Grippo | G04B 45/0076 428/688 |
| 2008/0181061 | A1* | 7/2008 | Girardin | G04B 37/228 368/295 |
| 2009/0185304 | A1* | 7/2009 | Harley, Jr. | G04B 37/0008 359/894 |
| 2012/0190321 | A1* | 7/2012 | Sato | C22C 38/42 420/586.1 |
| 2014/0169143 | A1* | 6/2014 | Kobayashi | G04G 17/02 29/407.09 |
| 2016/0054707 | A1 | 2/2016 | Kraehenbuehl et al. | |
| 2016/0313701 | A1* | 10/2016 | Coakley | G04B 3/048 |
| 2017/0038734 | A1* | 2/2017 | Issartel | B23K 26/0624 |
| 2017/0139376 | A1 | 5/2017 | Bazin | |
| 2017/0248922 | A1* | 8/2017 | Hynecek | A45C 11/12 |
| 2018/0275608 | A1* | 9/2018 | Ichimura | G04B 37/106 |
| 2019/0000195 | A1* | 1/2019 | Golay | G04B 37/1486 |

FOREIGN PATENT DOCUMENTS

| | | | | |
|---|---|---|---|---|
| JP | H06-238473 | A | | 8/1994 |
| JP | H06238473 | | * | 8/1994 |
| JP | 2011-164078 | A | | 8/2011 |
| JP | 2015-121412 | A | | 7/2015 |
| JP | 2016-117225 | A | | 6/2016 |
| WO | WO-2017109674 | A1 | * | 6/2017 |

OTHER PUBLICATIONS

DE4106151A1 translation (Year: 2024).*
Jph06238473—Translation (Year: 2024).*
Notice of Reasons for Refusal dated Nov. 4, 2020 received in Japanese Patent Application No. JP 2018-189354 together with an English language translation.
Office Action dated Mar. 30, 2021 received in U.S. Appl. No. 16/574,153.
Notice of Allowance dated Jul. 20, 2021 received in U.S. Appl. No. 16/574,153.

* cited by examiner

CASE AND TIMEPIECE

CROSS-REFERENCE TO RELATED APPLICATIONS

This application is a continuation application of U.S. patent application Ser. No. 16/574,153, filed on Sep. 18, 2019, which claims the benefit of priority from prior Japanese Patent Application No. 2018-189354, filed on Oct. 4, 2018, the entire contents of which are incorporated herein by reference.

BACKGROUND

Technical Field

The technical field relates to a case and a timepiece.

Description of the Related Art

In the related art, there is a method of forming a case for a timepiece or the like by integrally joining a main case body and exterior members such as a bezel.

For example, in JP-A-2015-121412 discloses an example in which a case for a timepiece is configured by integrating exterior members with a main case body by caulking.

By forming a case for a timepiece or the like by joining a plurality of members as described above, it is possible to realize a more complicated device more superior in design, such as a timepiece.

As a method of joining a plurality of members, besides caulking, screwing, laser welding, and so on can be used.

Especially, in the case of joining a plurality of members from the inner side by laser welding, the external appearance is not affected, and it is unnecessary to separately prepare members such as screws. Therefore, a small number of components is required, and it is possible to make the entire case thinner and smaller.

However, in the case of trying to weld small members like a main case body and an exterior member for a timepiece or the like from the inner side of the case, constraints are placed on the irradiation position and angle of laser light, and sometimes, it is required to irradiate a welding part at a slant with laser light.

In this case, from the welding part irradiated with the laser light, the laser light is reflected, and a part on which the reflected light has arrived might be melt.

For example, if the inside of the case for a timepiece or the like is melted, whereby the surface gets rough, in the case of storing members inside the case, it is impossible to exactly position them, or they jounce.

SUMMARY

According to one aspect of the disclosure, a case includes a main case body and an exterior member. The exterior member is welded to the main case body with laser light. The laser light is irradiated onto an irradiation surface. A welding part of the main case body and the exterior member is formed on the inner periphery surface extending along a height direction of the case and is formed such that the irradiation surface is perpendicular to the incident laser light.

DETAILED DESCRIPTION

First Embodiment

With reference to FIG. 1 to FIG. 3A and FIG. 3B, a first embodiment of a case and a timepiece having the case will be described. Also, in the present embodiment, the case where a case is applied to a timepiece which can be worn on a wrist (a wristwatch) will be described as an example.

Figure 1:
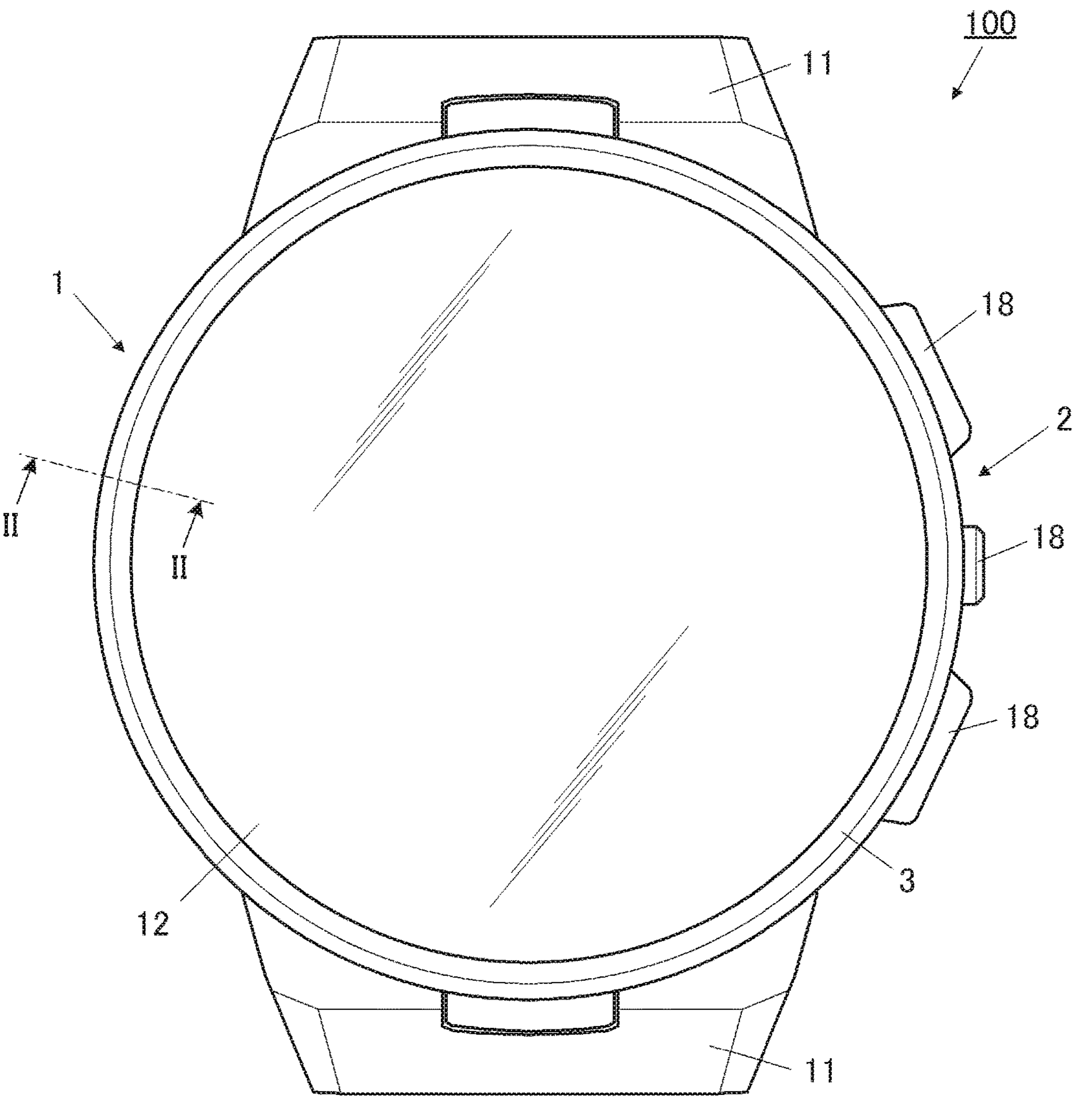
FIG. 1 is a front view of a timepiece of an embodiment.
Figure 2:
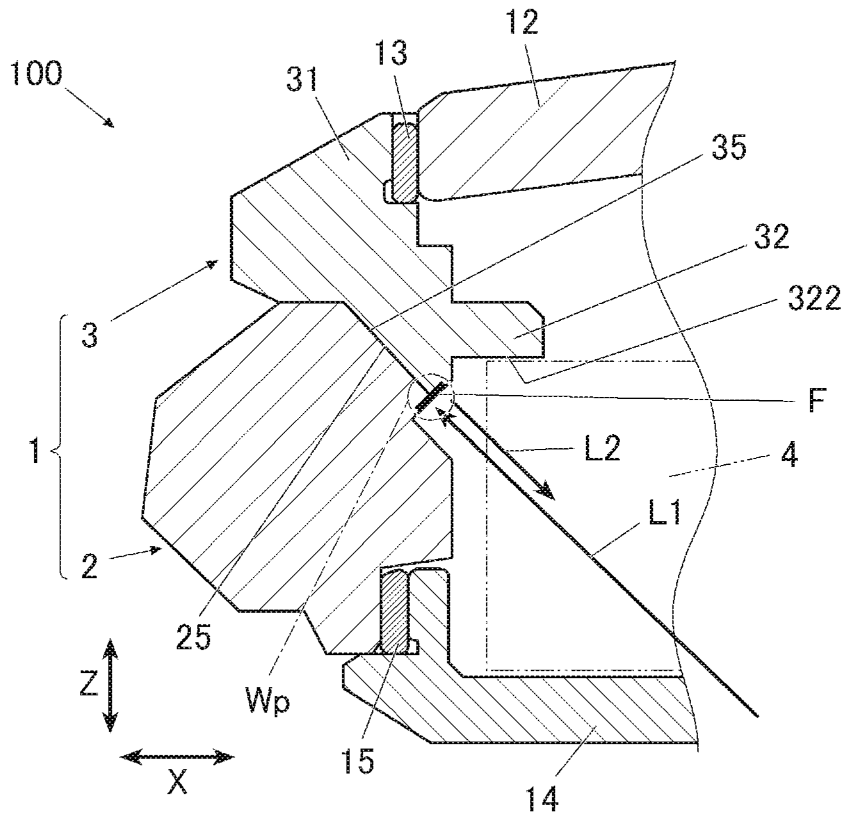
FIG. 2 is a cross-sectional view of a main part along a line II-II shown in FIG. 1.

FIG. 1 is a front view of a timepiece (a wristwatch) according to the present embodiment, and FIG. 2 is a cross-sectional view of a main part along a line shown in FIG. 1.

A timepiece 100 according to the present embodiment is, for example, an analog type timepiece which displays time by rotating hands (a second hand, a minute hand, and an hour hand) not shown in the drawings. However, in FIG. 1, the hands, a dial having them, and so on are not shown. Further, the timepiece is not limited to an analog type timepiece. For example, the timepiece may be a digital type timepiece having a liquid crystal display unit and so on, or may be a timepiece having a display unit having both of an analog system and a digital system.

As shown in FIG. 1 and FIG. 2, the timepiece 100 has a case 1 which includes a main case body 2 and an exterior member 3.

The exterior member 3 is a member which is disposed on the upper side of the main case body 2 (the upper side in FIG. 2, i.e. the viewable side), and is, for example, a bezel, a decorative ring, or the like.

As will be described below, the main case body 2 and the exterior member 3 are made so as to be able to be integrated by laser welding, thereby forming the case 1. Also, parts colored with heavy black lines in FIG. 2 and so on are parts which are melted during laser welding.

The case 1 is formed in a short hollow cylinder shape, and have openings at the top and the bottom in the thickness direction of the timepiece 100.

Also, although the case where the shape of the timepiece 100 as seen from the viewable side is almost circular as seen in a plan view and the case 1 is formed in an almost cylindrical shape is given as an example in the present embodiment, the shape of the timepiece 100 is not limited to the example shown in the drawings. For example, the shape of the timepiece as seen from the viewable side may be an elliptical shape, a rectangular shape, or the like as seen in a plan view.

On the front side of the case 1, a windshield member 12 made of a transparent member such as glass is provided so as to cover the opening part. The windshield member 12 is mounted on the exterior member 3 with a waterproof ring 13 interposed therebetween, so as to block the opening part on the front side such that airtightness is ensured.

Also, on the lower side of the case 1 (the lower side in a Z direction in FIG. 2, i.e. the rear side of the timepiece 100), a back lid member 14 is provided. The back lid member 14 is mounted on the main case body 2 with a waterproof ring 15 interposed therebetween, so as to block the opening part on the rear side such that airtightness is ensured. However, the case 1 and the back lid member 14 may be integrally molded so as not to have an opening part on the lower side of the case 1.

Inside the case 1, a module 4 (see FIG. 2 and so on) having, for example, a motor to serve as a drive source for operating the hands, a gear mechanism, and so on is stored.

As shown in FIG. 1, parts of the lateral surface of the case 1 corresponding to the 12 o'clock position and 6 o'clock position of the timepiece (i.e. the upper and lower end parts in FIG. 1) have band attaching parts 11 which a timepiece band (not shown in the drawings) can be attached to.

Also, the timepiece 100 has operation buttons 18 on the side part and the like of the case 1. The operation buttons 18 are, for example, push buttons, crowns, and so on. The operation buttons 18 are configured such that the insertion-side end parts of the operation buttons 18 are connected to the module 4 stored in the case 1 and various operations are possible by pushing or rotating the operation buttons 18.

The main case body 2 is short and is almost cylindrical, and the upper side of the main case body 2 has an inclined surface 25 formed from the inner periphery side of the main case body 2 toward the outer periphery side so as to be gradually wider upward as shown in FIG. 2.

The exterior member 3 of the present embodiment is an almost annular member, and has a main body part 31, and a flange part (in the present embodiment, an inward flange part 32) extending from the inner periphery surface of the main body part 31 toward the inner side of the main case body 2.

The lower surface of the inward flange part 32 constitutes a module receiving surface 322 for receiving the module 4 to be disposed inside the case 1.

Also, the lower side of the main body part 31 of the exterior member 3 has an inclined surface 35 formed from the inner periphery side of the exterior member 3 toward the outer periphery side so as to be gradually wider upward as shown in FIG. 2.

In the present embodiment, the contact surface of the main case body 2 and the exterior member 3 is a slope forming a tapered shape being gradually wider upward. Specifically, the inclined surface 25 of the main case body 2 and the inclined surface 35 of the exterior member 3 constitute the contact surface.

Like this, the inclined surface 25 and the inclined surface 35 which are slopes to form the tapered shape being gradually wider upward come into contact. Therefore, the main case body 2 and the exterior member 3 are positioned such that misalignment in the radial direction of the case 1 does not occur, and center misalignment in which the centers of the main case body 2 and the exterior member 3 are misaligned does not occur. Therefore, by only placing the exterior member 3 on the main case body 2, it is possible to easily and accurately perform positioning in the radial direction of the case 1.

In the present embodiment, as shown in FIG. 2, a welding part Wp of the main case body 2 and the exterior member 3 to be irradiated with the laser light L1 is formed in the inner periphery surface of the case 1 extending along the height direction Z of the timepiece 100 which is a direction perpendicular to the thickness direction X of the case 1 as shown in FIG. 2. Also, as shown in FIG. 2, in the welding part Wp of the main case body 2 and the exterior member 3 to be irradiated with the laser light L1, some parts of the main case body 2 and the exterior member 3 are cut out obliquely. In this way, the welding part Wp is formed such that an irradiation surface F to be irradiated with the laser light L1 is perpendicular to the incident laser light L1.

FIG. 2 shows, as an example, the case where the inclination angle of the contact surface which includes the inclined surface 25 of the main case body 2 and the inclined surface 35 of the exterior member 3 is almost equal to the irradiation angle of the laser light L1 and the contact surface is formed along the irradiation angle of the laser light L1. However, the inclination angle of the contact surface is not particularly limited, and may not be equal to the irradiation angle of the laser light L1.

Figure 3A:
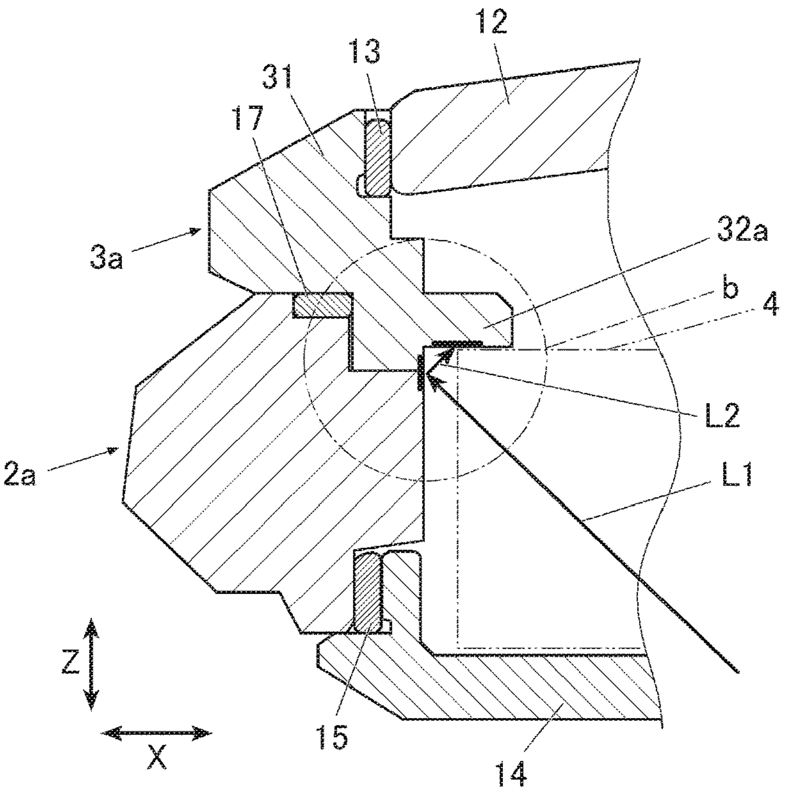
FIG. 3A is a cross-sectional view of a main part of a configuration of the related art in the case where laser welding of a main case body and an exterior member has been performed.
Figure 3B:
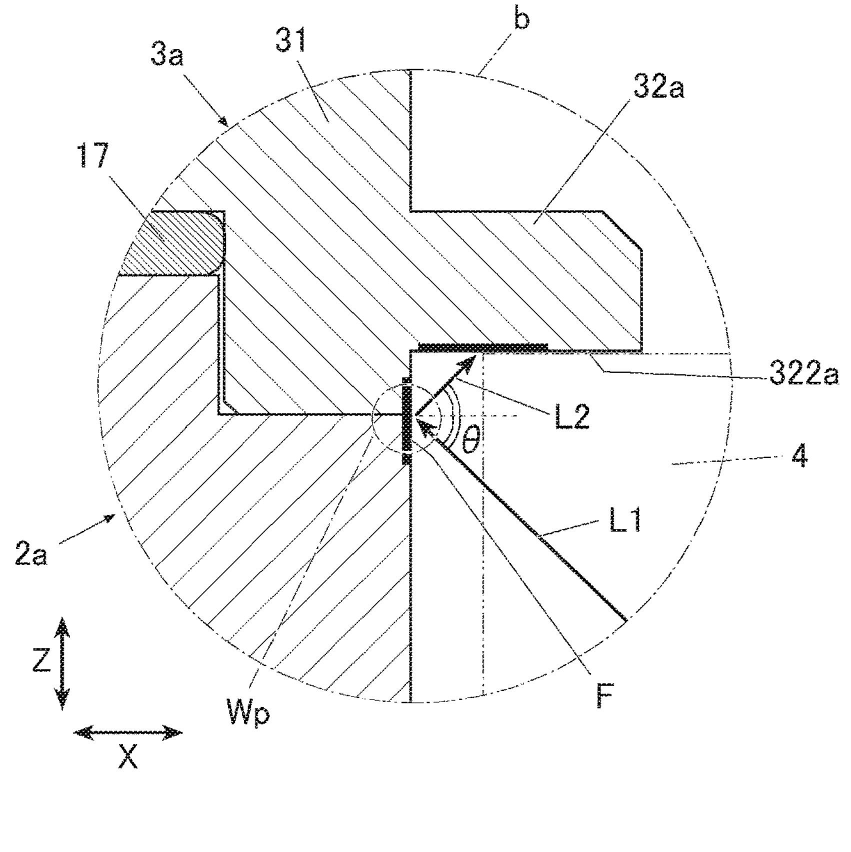
FIG. 3B is an enlarged view of Part "b" surrounded by a dash-dot line in FIG. 3A.

In laser welding, if the irradiation surface F is obliquely irradiated with the laser light L1, as compared to the case where the irradiation surface is irradiated from the front, the efficiency of welding (adhesion) is bad, and the reflected light L2 from the irradiation surface F arrives at the position corresponding to the incidence angle θ of laser light L1 to the irradiation surface F (see FIG. 3B).

For purposes such as improving the accuracy of positioning of the module 4, the module 4 needs to be received by a surface which is as stable as possible (a surface having high surface accuracy) and does not jounce. Therefore, it is preferable that the surface of the module receiving surface 322 be as flat as possible.

However, as shown in FIG. 3A and FIG. 3B, in the case of welding the main case body 2 and the exterior member 3, when the laser light L1 is radiated upward from the diagonal lower side of the case 1, if the irradiation surface F is not perpendicular to the laser light L1, the reflected light L2 arrives at parts such as the lower surface of an inward flange part 32*a*, and those parts are melted by the reflected light L2.

If the lower surface of the inward flange part 32*a* is melted by the reflected light L2, the surface gets rough, and irregularities of about 1 mm are formed.

In this case, if the arrival position of the reflected light L2 and a module receiving surface 322*a* are flush with each other and are connected, the influence of the reflected light L2 spreads to the lower surface of the inward flange part 32*a*, and as shown in FIG. 3B, even the surface of the module receiving surface 322*a* for receiving the module 4 melts and gets rough.

For this point, if the irradiation surface F to be irradiated with the laser light L1 is formed in the welding part Wp so as to be perpendicular to the incident laser light L1 like in the present embodiment, the reflected light L2 of the laser light L1 from the irradiation surface F is emitted toward a laser generating device (not shown in the drawings) which is the radiation source of the laser light L1, almost in parallel with the laser light L1, as shown in FIG. 2, and is absorbed by the laser generating device.

Therefore, the reflected light L2 does not scatter, so it is possible to prevent the surface of the module receiving surface 322 from melting and getting rough. Also, since scorch, soot, and the like attributable to the reflected light L2 do not adhere to the inner side of the case 1, it is possible to prevent the inside of the case 1 from being contaminated.

In the present embodiment, the main case body 2 and the exterior member 3 which constitute the case 1 are made of metal materials such as SUS (Steel Special Use Stainless), titanium, and the like.

As described above, the exterior member 3 needs to be welded to the main case body 2 with a laser. Therefore, in terms of adhesivity, it is preferable that the main case body 2 and the exterior member 3 be made of the same material (for example, if the main case body 2 is made of titanium, it is preferable to make the exterior member 3 of titanium, and if the main case body 2 is made of SUS, it is preferable to make the exterior member 3 of SUS).

However, the main case body 2 and the exterior member 3 are not limited to those made of the same material, and may be made of different materials as long as the materials can be welded with a laser (for example, it is possible to make the main case body 2 of titanium and make the exterior member 3 of tungsten).

Now, the action of the case 1 and the timepiece 100 having the case 1 according to the present embodiment will be described.

When the timepiece 100 is assembled, first, the exterior member 3 is placed on the upper side of the main case body 2.

At this time, the main case body 2 and the exterior member 3 come into contact at the inclined surface 25 and the inclined surface 35 which are slopes to form the tapered shape being gradually wider upward. Therefore, the positions of the main case body 2 and the exterior member 3 in the radial direction are defined with high accuracy, without causing center misalignment.

Next, as shown in FIG. 2, the welding part Wp of the main case body 2 and the exterior member 3 is welded from the rear side of the case 1 with laser light. Specifically, the laser light L1 is radiated from the vicinity of the center part (the center of the annular shape) of the rear side of the main case body 2 toward the part which is a surface to be the inner periphery surface of the case 1 and at which the main case body 2 and the exterior member 3 need to be welded (the welding part Wp). As a result, a part of the welding part Wp melts and the main case body 2 and the exterior member 3 adhere to each other.

In the present embodiment, the irradiation surface F of the welding part Wp is formed so as to be perpendicular to the incident laser light L1. Therefore, the reflected light L2 from the irradiation surface F is emitted toward the laser generating device (not shown in the drawings) which is the radiation source of the laser light L1, almost in parallel with the laser light L1, and is absorbed by the laser generating device. Therefore, the module receiving surface 322 is prevented from being melted by the reflected light L2. As a result, the module receiving surface 322 is maintained as a surface which has high surface accuracy and is free from the influence of the reflected light L2.

Further, the module 4 is disposed from the rear side of the case 1.

At this time, the upper surface of the module 4 is brought into contact with the module receiving surface 322.

Since the module receiving surface 322 is not melted by the reflected light L2, and the surface is maintained in the flat state without roughness, the module 4 is precisely positioned so as not to jounce.

If necessary components such as the module 4 are assembled and stored inside the case 1, the back lid member 14 is attached to the opening part of the rear side of the case 1 with the waterproof ring 15 interposed therebetween, so as to block the opening part of the rear side.

Also, the windshield member 12 is attached to the opening part of the front side (the viewable side) of the case 1 with the waterproof ring 13 interposed therebetween, so as to block the opening part of the front side (the viewable side).

Then, assembling of the timepiece 100 having the case 1 is completed.

As described above, in the case of forming the case 1 by integrating the main case body 2 and the exterior member 3 by laser welding, the welding part Wp of the main case body 2 and the exterior member 3 is formed such that the irradiation surface F to be irradiated with the laser light L1 is perpendicular to the incident laser light L1.

Therefore, the reflected light L2 does not scatter, and it is possible to prevent the influence of the reflected light L2 from being exerted on parts required to have flat surfaces, such as the module receiving surface 322.

Therefore, it is possible to precisely position the module 4 on the flat module receiving surface 322 which is a surface having high surface accuracy so as not to jounce, and assembling in the case 1 with high accuracy is possible.

Also, since the laser light L1 is radiated so as to be perpendicular to the irradiation surface F, the adhesion efficiency improves, and it is possible to join the main case body 2 and the exterior member 3 at the welding part Wp to the necessary and sufficient extent. Therefore, it is possible to ensure sufficient waterproof performance without separately disposing waterproof rings and so on.

Also, the exterior member 3 of the present embodiment has the inward flange part 32 which is placed on the upper side of the main case body 2 so as to extend toward the inner side of the main case body 2, and the lower surface of the inward flange part 32 constitutes the module receiving surface 322 for receiving the module 4 to be placed inside the main case body 2.

Even in this case, the lower surface of the inward flange part 32 constituting the module receiving surface 322 is prevented from being melted by the reflected light L2, whereby it is possible to prevent the influence of the reflected light L2 from being exerted on parts required to have flat surfaces, such as the module receiving surface 322.

Therefore, it is possible to precisely position the module 4 on the flat module receiving surface 322 so as not to jounce, and assembling in the case 1 with high accuracy is possible.

Also, in the present embodiment, the contact surface of the main case body 2 and the exterior member 3 is a slope to form a tapered shape being gradually wider upward.

As a result, the positions of the main case body 2 and the exterior member 3 in the radial direction are defined with high accuracy by only placing the exterior member 3 on the upper side of the main case body 2, without causing center misalignment, and it is possible to form the case 1 without unevenness in the radial direction.

Also, in the case where the timepiece 100 is configured to have the case 1 and the module 4 stored in the module 4, if the main case body 2 and the exterior member 3 are welded by laser light, since members such as screws are not used, it is possible to make the case 1 thin and light.

Therefore, it is possible to realize the timepiece 100 having the case 1 having excellent design, with no constraint on design.

Also, even in the case of forming the case 1 by laser welding, it is possible to precisely position the module 4 on the module receiving surface 322 maintained flat.

Therefore, it is possible to make the timepiece 100 having high accuracy and excellent in the efficiency of assembling.

Second Embodiment

Now, with reference to FIG. 4A, a second embodiment of the case and the timepiece will be described. By the way, the present embodiment is different from the first embodiment in the shapes and so on of the main case body and the exterior member which constitute the case. Therefore, hereinafter, particularly, the differences from the first embodiment will be described.

Figure 4A:
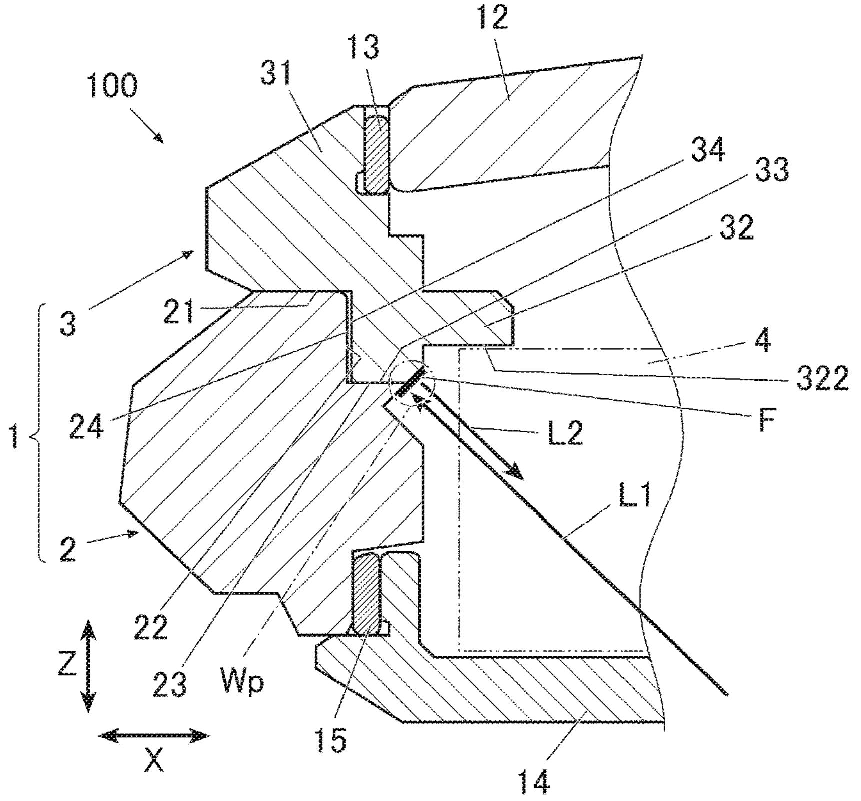
FIG. 4A is a cross-sectional view of a main part of a timepiece according to a second embodiment.

FIG. 4A is a cross-sectional view of a main body part of the case and the timepiece according to the present embodiment.

As shown in FIG. 4A, in the present embodiment, like in the first embodiment, the timepiece 100 has the case 1 configured by integrating the main case body 2 and the exterior member 3 by laser welding.

The main case body 2 of the present embodiment is short and is almost cylindrical, and the upper side of the main case body 2 has a stair part 22 formed such that an end surface 23 on the inner periphery side is lower than an end surface 21 on the outer periphery side by one step as shown in FIG. 4A.

The end surface 23 on the inner periphery side which constitutes the bottom of the stair part 22 is a surface almost parallel with the thickness direction X of the main case body 2 (see FIG. 4A).

Also, an inner periphery surface 24 of the stair part 22 is an almost vertical surface extending along the height direction Z of the timepiece 100 (see FIG. 4A) which is a direction perpendicular to the thickness direction X of the main case body 2.

The exterior member 3 of the present embodiment has a main body part 31, and an inward flange part 32 which extends from the inner periphery surface of the main body part 31 toward the inner side of the main case body 2, like in the first embodiment. The lower surface of the inward flange part 32 constitutes a module receiving surface 322 for receiving the module 4 to be disposed inside the case 1.

Also, the inner periphery side of the main body part 31 positioned on the lower side is formed so as to have a length in the height direction Z of the timepiece 100 longer than that of the outer periphery side, and is disposed inside the stair part 22 of the main case body 2.

In this case, a lower end surface 33 of the main body part 31 of the exterior member 3 facing the end surface 23 of the inner periphery side of the main case body 2 is a surface almost parallel with the thickness direction X of the main case body 2, similarly to the end surface 23 of the inner periphery side of the main case body 2. Also, an outer periphery surface 34 of the main body part 31 of the exterior member 3 facing the inner periphery surface 24 of the main case body 2 is an almost vertical surface extending along the height direction Z of the timepiece 100, similarly to the inner periphery surface 24 of the main case body 2.

In the present embodiment, the contact surface of the main case body 2 and the exterior member 3 includes a first abutting surface parallel with the thickness direction X of the main case body 2 and a second abutting surface perpendicular to the thickness direction X of the main case body 2, and specifically, the end surface 23 of the inner periphery side of the main case body 2 and the lower end surface 33 of the exterior member 3 constitute one abutting surface (the first abutting surface), and the inner periphery surface 24 of the main case body 2 and the outer periphery surface 34 of the exterior member 3 constitute the other abutting surface (the second abutting surface).

Like this, the end surface 23 of the inner periphery side of the main case body 2 and the lower end surface 33 of the exterior member 3 constituting the first abutting surface parallel with the thickness direction X of the main case body 2 come into contact. Therefore, the main case body 2 and the exterior member 3 are positioned such that misalignment in the height direction Z of the timepiece 100 does not occur.

Also, in the present embodiment, as shown in FIG. 4A, in the welding part Wp of the main case body 2 and the exterior member 3 to be irradiated with the laser light L1, some parts of the main case body 2 and the exterior member 3 are cut out obliquely. In this way, like in the first embodiment, the welding part Wp is formed such that an irradiation surface F to be irradiated with the laser light L1 is perpendicular to the incident laser light L1.

Therefore, the reflected light L2 of the laser light L1 from the irradiation surface F is emitted toward the laser generating device (not shown in the drawings) which is the radiation source of the laser light L1, almost in parallel with the laser light L1, as shown in FIG. 4A, and is absorbed by the laser generating device.

Therefore, the reflected light L2 does not scatter, so it is possible to prevent the surface of the module receiving surface 322 from melting and getting rough. Also, since scorch, soot, and the like attributable to the reflected light L2 do not adhere to the inner side of the case 1, it is possible to prevent the inside of the case 1 from being contaminated.

By the way, the other configuration is the same as that of the first embodiment. Therefore, identical members are denoted by the same reference symbols, and a description thereof will not be made.

Now, the action of the case 1 and the timepiece 100 according to the present embodiment will be described.

In the present embodiment, when the timepiece 100 is assembled, first, the exterior member 3 is placed on the upper side of the main case body 2.

At this time, the main case body 2 and the exterior member 3 come into contact at the first abutting surface parallel with the thickness direction X of the main case body 2 (the end surface 23 of the inner periphery side of the main case body 2 and the lower end surface 33 of the exterior member 3). As a result, the main case body 2 and the exterior member 3 are positioned such that misalignment in the height direction Z of the timepiece 100 does not occur.

Next, as shown in FIG. 4A, the welding part Wp of the main case body 2 and the exterior member 3 is welded from the rear side of the case 1 with laser light. Specifically, the laser light L1 is radiated from the vicinity of the center part (the center of the annular shape) of the rear side of the main case body 2 toward the part which is a surface to be the inner periphery surface of the case 1 and at which the main case body 2 and the exterior member 3 need to be welded (the welding part Wp). As a result, a part of the welding part Wp melts and the main case body 2 and the exterior member 3 adhere to each other.

In the present embodiment, the irradiation surface F of the welding part Wp is formed so as to be perpendicular to the incident laser light L1. Therefore, the reflected light L2 from the irradiation surface F is emitted toward the laser generating device (not shown in the drawings) which is the radiation source of the laser light L1, almost in parallel with the laser light L1, and is absorbed by the laser generating device. Therefore, the module receiving surface 322 is prevented from being melted by the reflected light L2.

Further, the module 4 is disposed from the rear side of the case 1.

At this time, the upper surface of the module 4 is brought into contact with the module receiving surface 322.

Since the module receiving surface 322 is not melted by the reflected light L2, and the surface is maintained in the flat state without roughness, the module 4 is precisely positioned so as not to jounce.

By the way, the other points are the same as those in the first embodiment. Therefore, a description thereof will not be made.

As described above, according to the present embodiment, while the same effects as those of the first embodiment are obtained, it is possible to obtain the following effects.

In other words, in the present embodiment, the contact surface of the main case body 2 and the exterior member 3 includes the end surface 23 of the inner periphery side and the lower end surface 33 constituting the first abutting surface parallel with the thickness direction X of the main case body 2, and the inner periphery surface 24 and the outer periphery surface 34 constituting the second abutting surface perpendicular to the thickness direction X of the main case body 2.

Like this, the main case body 2 and the exterior member 3 come into contact at the end surface 23 of the inner periphery side and the lower end surface 33 constituting the first abutting surface parallel with the thickness direction X of the main case body 2. As a result, the position of the exterior member 3 relative to the main case body 2 in the height (thickness) direction Z of the timepiece 100 is surely defined, and it is possible to form the case 1 without unevenness in the height (thickness) direction Z of the timepiece 100.

Therefore, even in the case of taking the above-mentioned configuration, in the present embodiment, the irradiation surface F to be irradiated with the laser light L1 is formed so as to be perpendicular to the incident laser light L1.

Therefore, similarly in the first embodiment, the reflected light L2 which is caused when the laser light L1 strikes the irradiation surface F is emitted almost in parallel with the laser light L1, and is absorbed by the radiation source of the laser light L1, and does not scatter.

Therefore, even in the case of forming the case 1 by laser welding, it is possible to precisely position the module 4 on the module receiving surface 322 maintained flat, and it is possible to make the timepiece 100 having high accuracy and excellent in the efficiency of assembling.

Also, in the present embodiment, the case 1 has the configuration having no waterproof ring between the main case body 2 and the exterior member 3; however, the configuration of the case 1 is not limited thereto.

Figure 4B:
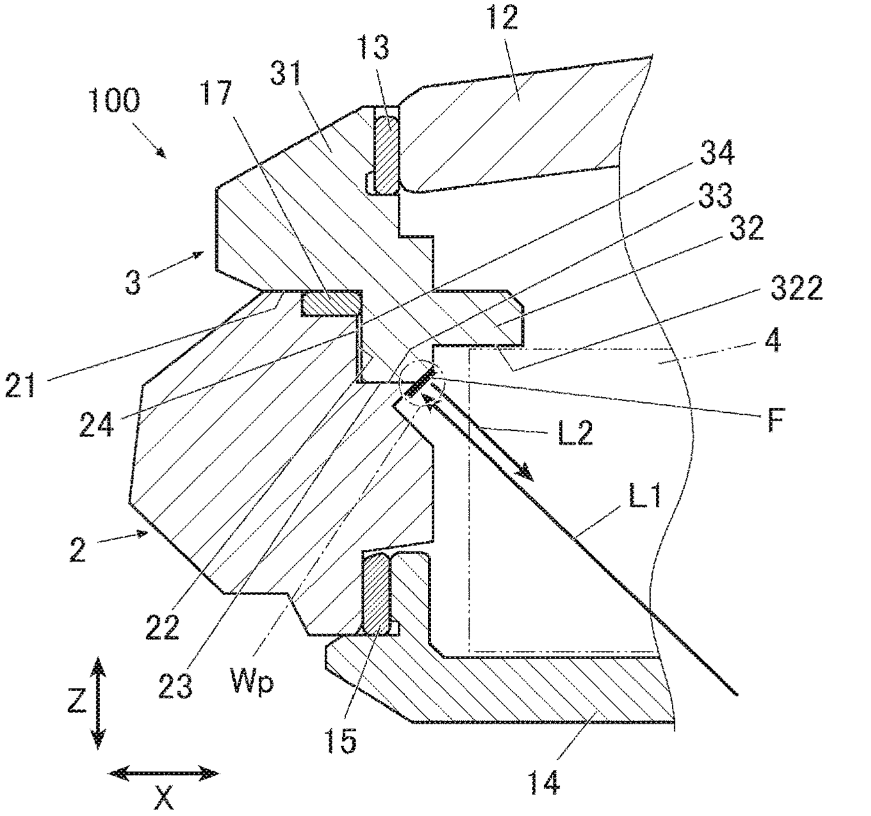
FIG. 4B is a cross-sectional view of a main part of a modification of the timepiece shown in FIG. 4A.

For example, as shown in FIG. 4B, on the end surface 21 of the outer periphery side of the main case body 2, a waterproof ring 17 may be placed, and a part of the outer periphery side of the exterior member 3 positioned on the lower side of the main body part 31 may be placed on the end surface 21 of the outer periphery side of the main case body 2 with the waterproof ring 17 interposed therebetween.

In this case, it is possible to ensure airtightness between the main case body 2 and the exterior member 3 not only by adhesion of the main case body 2 and the exterior member 3 but also the waterproof ring 17, and it is possible to realize the case 1 having high reliability in airtightness.

For example, in the case where the insertion-side shaft parts, pipe members, and the like of the operation buttons 18 are inserted in the case 1, radiation of the laser light L1 onto the welding part Wp may be hindered. In this case, it is difficult to weld the main case body 2 and the exterior member 3 without discontinuity over the entire periphery of the case 1. For this reason, the waterproof ring 17 is provided between the main case body 2 and the exterior member 3. In this case, even if welding is performed in such a manner to avoid the parts where there are the operation buttons 18 and the like, it is possible to surely ensure airtightness between the main case body 2 and the exterior member 3.

Also, even in the case where it is possible to perform laser welding in a state where the operation buttons 18 do not exist, besides ensuring of airtightness by adhesion, if the waterproof ring 17 is provided, it is possible to further improve reliability in airtightness.

Third Embodiment

Now, with reference to FIG. 5A and FIG. 5B, a third embodiment of the case and the timepiece will be described. By the way, the third embodiment is different from the first embodiment and the second embodiment in the shapes and so on of the main case body and the exterior member which constitute the case. Therefore, hereinafter, particularly, the differences from the first embodiment and so on will be described.

Figure 5A:
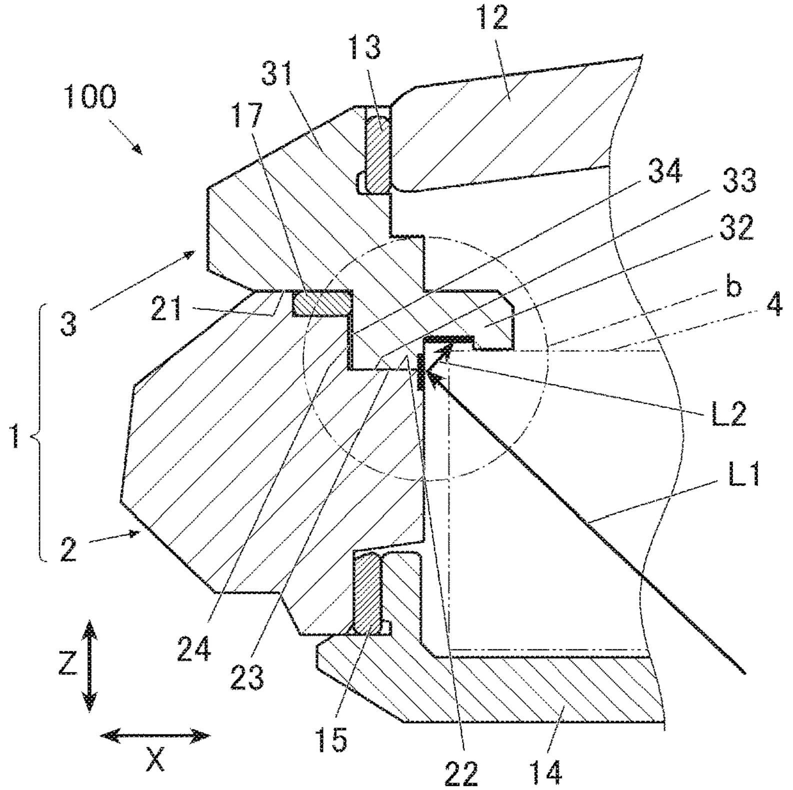
FIG. 5A is a cross-sectional view of a main part according to a third embodiment.
Figure 5B:
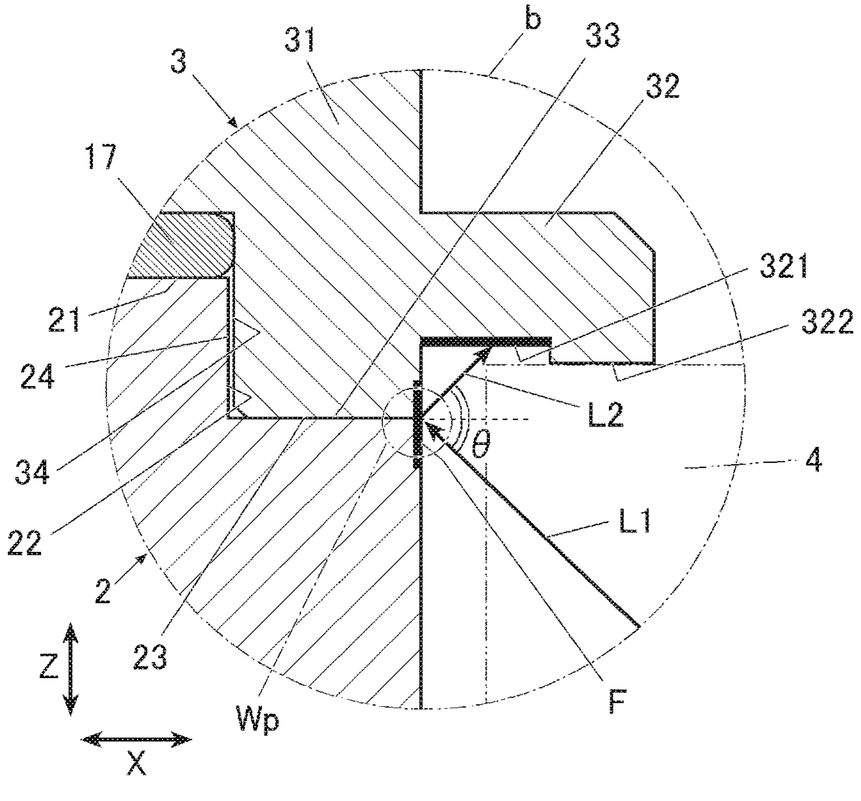
FIG. 5B is an enlarged view of Part "b" surrounded by a dash-dot line in FIG. 5A.

FIG. 5A is a cross-sectional view of a main part of the case and the timepiece according to the present embodiment, and FIG. 5B is an enlarged view of a part surrounded by a dash-dot line in FIG. 5A.

As shown in FIG. 5A and FIG. 5B, in the present embodiment, like in the first embodiment and so on, the timepiece 100 has the case 1 configured by integrating the main case body 2 and the exterior member 3 by laser welding.

The main case body 2 of the present embodiment is short and is almost cylindrical, and the upper side of the main case body 2 has a stair part 22 formed such that an end surface 23 on the inner periphery side is lower than an end surface 21 on the outer periphery side by one step as shown in FIG. 5A, FIG. 5B, and so on.

The end surface 23 on the inner periphery side which constitutes the bottom of the stair part 22 is almost parallel with the thickness direction X of the main case body 2 (see FIG. 5A, FIG. 5B, and so on).

Also, an inner periphery surface 24 of the stair part 22 is an almost vertical surface extending along the height direction Z of the timepiece 100 (see FIG. 5A, FIG. 5B, and so on) which is a direction perpendicular to the thickness direction X of the main case body 2.

The exterior member 3 of the present embodiment has a main body part 31, and an inward flange part 32 which extends from the inner periphery surface of the main body part 31 toward the inner side of the main case body 2, like in the first embodiment and so on.

In the present embodiment, as shown in FIG. 5A and so on, a part of the outer periphery side of the exterior member 3 positioned on the lower side of the main body part 31 is disposed on the end surface 21 of the outer periphery side of the main case body 2 with a waterproof ring 17 interposed therebetween.

Also, the inner periphery side of the main body part 31 positioned on the lower side is formed so as to have a length in the height direction Z of the timepiece 100 longer than that of the outer periphery side, and is disposed in the stair part 22 of the main case body 2.

In this case, a lower end surface 33 of the main body part 31 of the exterior member 3 facing the end surface 23 of the inner periphery side of the main case body 2 is a surface almost parallel with the thickness direction X of the main case body 2, similarly to the end surface 23 of the inner periphery side of the main case body 2. Also, an outer periphery surface 34 of the main body part 31 of the exterior member 3 facing the inner periphery surface 24 of the main case body 2 is an almost vertical surface extending along the height direction Z of the timepiece 100, similarly to the inner periphery surface 24 of the main case body 2.

In the present embodiment, unlike in the first embodiment and so on, as shown in FIG. 5B, in the welding part Wp, the irradiation surface F is an almost vertical surface extending along the height direction Z of the timepiece 100. Therefore, the laser light L1 is radiated obliquely upward at a predetermined incidence angle θ from the lower side of the case 1 (in FIG. 5A and so on, the lower side, i.e. the rear side of the timepiece 100) with respect to the irradiation surface F. Therefore, the laser light L1 is reflected from the irradiation surface F, whereby the reflected light L2 is generated.

At a position on the lower surface of the inward flange part 32 on which the reflected light L2 of the laser light L1, which is radiated toward the welding part Wp of the main case body 2 and the exterior member 3, from an irradiation surface F arrives corresponding to the incidence angle θ of the laser light to the irradiation surface F, a reflected-light receiving part 321 for preventing spreading of melting from being caused by the reflected light L2 is formed.

Also, the part of the lower surface of the inward flange part 32 without the reflected-light receiving part 321 (in the present embodiment, the part of the inner periphery side of the exterior member 3) constitutes a module receiving surface 322 for receiving the module 4 to be disposed inside the case 1.

As described above, in the case of welding the main case body 2*a* and the exterior member 3*a* by obliquely irradiating the irradiation surface F with the laser light L1, if the lower surface of the inward flange part 32*a* does not have the reflected-light receiving part 321, a part on which the reflected light L2 from the irradiation surface F arrives corresponding to the incidence angle θ to the irradiation surface F (in the present embodiment, the lower surface of the inward flange part 32*a*) is melted by the reflected light L2. If the lower surface of the inward flange part 32*a* is melted by the reflected light L2, the surface gets rough.

In this case, if the arrival position of the reflected light L2 and the module receiving surface 322 are flushed with each other and are connected, the influence of the reflected light L2 spreads throughout the lower surface of the inward flange part 32*a*, and as shown in FIG. 3B, even the surface of the module receiving surface 322 which needs to receive the module 4 melts, and gets rough, and is a jouncing state.

For this point, if the reflected-light receiving part 321 which is not flush with the module receiving surface 322 is provided at the arrival position of the reflected light L2 like in the present embodiment, the influence of the reflected light L2 is regulated within the reflected-light receiving part 321, so it is possible to prevent the surface of the module receiving surface 322 from melting and getting rough. Also, since scorch, soot, and the like attributable to the reflected light L2 do not adhere to the inner side of the case 1, it is possible to prevent the inside of the case 1 from being contaminated.

For example, in the case where the incidence angle θ of the laser light L1 to the irradiation surface F is 45 degrees, the output angle of the reflected light L2 from the irradiation surface F also is 45 degrees. For this reason, as shown in FIG. 5B, the reflected-light receiving part 321 is provided at the position on which the reflected light L2 arrives.

By the way, in laser welding, in the case of irradiating the irradiation surface F with the laser light L1 at an angle as close to a right angle as possible, it is possible to efficiently perform sufficient welding (adhesion). However, as the incidence angle θ decreases, the arrival position of the reflected light L2 shifts toward the inner periphery side of the inward flange part 32 (toward the center side of the case 1). Therefore, it is difficult to ensure the module receiving surface 322, and it is impossible to dispose the module 4 in the vicinity of the inner periphery surface of the case 1.

For this reason, the incidence angle θ of the laser light L1 to the irradiation surface F, the arrangement of the reflected-light receiving part 321, and the like are appropriately determined in view of the balance of the adhesivity of the main case body 2 and the exterior member 3 and ensuring of the module receiving surface 322.

In the present embodiment, the reflected-light receiving part 321 is a recess part formed in the lower surface of the inward flange part 32.

The reflected-light receiving part 321 is formed so as to be enough for receiving the reflected light and preventing spreading of melting to a part other than the reflected-light receiving part 321 and be able to sufficiently ensure the module receiving surface 322. To this end, in the present embodiment, over a part of the lower surface of the in the inward flange part 32 with about half of the width from the outer periphery side (for example, if the protruding width of the inward flange part 32 is about 1 mm, about 0.5 mm), the reflected-light receiving part 321 is formed. Also, it is preferable that the depth of the inward flange part 32 be about 0.1 mm to 0.2 mm considering that irregularities which can be formed during irradiation with the reflected light L2 are about 0.1 mm.

However, the shape, size, and so on of the reflected-light receiving part 321 are not particularly limited. For example, the reflected-light receiving part 321 may not have a recess shape and may be a stair part formed so as to have a step such that the reflected-light receiving part is not flush with the module receiving surface 322. Alternatively, the reflected-light receiving part 321 may have a configuration suppressing the influence of the reflected light L2 on the surroundings, for example, by attaching a material for absorbing the reflected light L2.

In the present embodiment, the contact surface of the main case body 2 and the exterior member 3 includes the first abutting surface parallel with the thickness direction X of the main case body 2 and the second abutting surface perpendicular to the thickness direction X of the main case body 2, and in the present embodiment, the end surface 23 of the inner periphery side of the main case body 2 and the lower end surface 33 of the exterior member 3 constitute one abutting surface (the first abutting surface), and the inner periphery surface 24 of the main case body 2 and the outer periphery surface 34 of the exterior member 3 constitute the other abutting surface (the second abutting surface).

Like this, the end surface 23 of the inner periphery side of the main case body 2 and the lower end surface 33 of the exterior member 3 constituting the first abutting surface parallel with the thickness direction X of the main case body 2 come into contact. Therefore, the main case body 2 and the exterior member 3 are positioned such that misalignment in the height direction Z of the timepiece 100 does not occur.

By the way, the other configuration is the same as those of the first embodiment and so on. Therefore, identical members are denoted by the same reference symbols, and a description thereof will not be made.

Now, the action of the case 1 and the timepiece 100 according to the present embodiment will be described.

In the present embodiment, when the timepiece 100 is assembled, first, the exterior member 3 is placed on the upper side of the main case body 2 with the waterproof ring 17 interposed therebetween.

At this time, the main case body 2 and the exterior member 3 come into contact at the first abutting surface parallel with the thickness direction X of the main case body 2 (the end surface 23 of the inner periphery side of the main case body 2 and the lower end surface 33 of the exterior member 3). As a result, the main case body 2 and the exterior member 3 are positioned such that misalignment in the height direction Z of the timepiece 100 does not occur.

Next, as shown in FIG. 5A and FIG. 5B, the welding part Wp of the main case body 2 and the exterior member 3 is welded from the rear side of the case 1 with laser light. Specifically, the laser light L1 is radiated from the vicinity of the center part (the center of the annular shape) of the rear side of the main case body 2 toward the part which is a surface to be the inner periphery surface of the case 1 and at which the main case body 2 and the exterior member 3 need to be welded (the welding part Wp). As a result, a part of the welding part Wp melts and the main case body 2 and the exterior member 3 adhere to each other.

At this time, the reflected light L2 from the irradiation surface F of the welding part Wp is radiated toward the lower surface of the inward flange part 32 at the angle according to the incidence angle θ of the laser light L1.

The reflected light L2 arrives the reflected-light receiving part 321 formed in the lower surface of the inward flange part 32, and melts the inside of the reflected-light receiving part 321 but does not go beyond the step of the reflected-light receiving part 321 having a recess shape. Therefore, the influence of the reflected light L2 is exerted on only the inside of the reflected-light receiving part 321, and spreading of melting to the module receiving surface 322 is prevented. As a result, the module receiving surface 322 is maintained as a surface which has high surface accuracy and is free from the influence of the reflected light L2.

Further, the module 4 is disposed from the rear side of the case 1.

At this time, the upper surface of the module 4 is brought into contact with the module receiving surface 322.

Since the module receiving surface 322 is not melted by the reflected light L2, and the surface is maintained in the flat state without roughness, the module 4 is precisely positioned so as not to jounce.

By the way, the other points are the same as those in the first embodiment and so on. Therefore, a description thereof will not be made.

As described above, according to the present embodiment, while the same effects as those of the first embodiment and so on are obtained, it is possible to obtain the following effects.

In other words, in the present embodiment, the contact surface of the main case body 2 and the exterior member 3 includes the end surface 23 of the inner periphery side and the lower end surface 33 constituting the first abutting surface parallel with the thickness direction X of the main case body 2, and the inner periphery surface 24 and the outer periphery surface 34 constituting the second abutting surface perpendicular to the thickness direction X of the main case body 2.

Like this, the main case body 2 and the exterior member 3 come into contact at the end surface 23 of the inner periphery side and the lower end surface 33 constituting the first abutting surface parallel with the thickness direction X of the main case body 2. As a result, the position of the exterior member 3 relative to the main case body 2 in the height (thickness) direction Z of the timepiece 100 is surely defined, and it is possible to form the case 1 without unevenness in the height (thickness) direction Z of the timepiece 100.

Therefore, even in the case of taking the above-mentioned configuration, according to the present embodiment, in the case of forming the case 1 by integrating the main case body 2 and the exterior member 3 by laser welding, the laser light L1 is radiated toward the welding part Wp of the main case body 2 and the exterior member 3. According to the present embodiment, at the position on which the reflected light L2 from the irradiation surface F arrives corresponding to the incidence angle θ of the laser light to the irradiation surface F, the reflected-light receiving part 321 for preventing spreading of melting from being caused by the reflected light L2 is formed.

Therefore, it is possible to regulate the part which is melted by the reflected light L2 within the reflected-light receiving part 321, and it is possible to prevent the influence of the reflected light L2 from being exerted on other parts required to have flat surfaces, such as the module receiving surface 322.

Therefore, it is possible to precisely position the module 4 on the flat module receiving surface 322 so as not to jounce, and assembling in the case 1 with high accuracy is possible.

Also, the exterior member 3 of the present embodiment has the inward flange part 32 which is placed on the upper side of the main case body 2 so as to extend toward the inner side of the main case body 2, and the reflected-light receiving part 321 is formed in the lower surface of the inward flange part 32, and the part of the lower surface of the inward flange part 32 without the reflected-light receiving part 321 constitutes the module receiving surface 322 for receiving the module 4 to be placed inside the main case body 2.

Therefore, even in the case where the reflected light L2 is radiated toward the lower surface of the inward flange part 32 constituting the module receiving surface 322, the part which is melted by the reflected light L2 is regulated within the reflected-light receiving part 321, whereby it is possible to prevent the influence of the reflected light L2 from being exerted on other parts required to have flat surfaces, such as the module receiving surface 322.

Therefore, it is possible to precisely position the module 4 on the flat module receiving surface 322 so as not to jounce, and assembling in the case 1 with high accuracy is possible.

Also, in the present embodiment, the waterproof ring 17 to be interposed between the main case body 2 and the exterior member 3 is further provided.

Therefore, it is possible to ensure airtightness between the main case body 2 and the exterior member 3 not only by adhesion of the main case body 2 and the exterior member 3 but also the waterproof ring 17, and it is possible to realize the case 1 having high reliability in airtightness.

The case 1 of the timepiece 100 has the operation buttons 18 such as push buttons, crowns, and the like on the side and the like. Since one-side ends of the operation buttons 18 are inserted into the case 1, in some assembly procedures and so on, the insertion-side shaft parts, pipe members, and the like of the operation buttons 18 may hinder radiation of the laser light L1 onto the welding part Wp. In this case, it is difficult to weld the main case body 2 and the exterior member 3 without discontinuity over the entire periphery of the case 1. For this reason, the waterproof ring 17 is provided between the main case body 2 and the exterior member 3. In this case, even if welding is performed in such a manner to avoid the parts where there are the operation buttons 18 and the like, it is possible to surely ensure airtightness between the main case body 2 and the exterior member 3.

Also, even in the case where it is possible to perform laser welding in a state where the operation buttons 18 do not exist, if the waterproof ring 17 is provided in addition to ensuring of airtightness by adhesion, it is possible to further improve reliability in airtightness.

Although the embodiments of the present invention have been described above, it goes not without saying that the present invention is not limited to the embodiments, and various modifications are possible without departing from the gist of the present invention.

For example, in the first embodiment, any waterproof ring is not interposed between the main case body 2 and the exterior member 3; however, the exterior member 3 may be placed on the main case body 2 with a waterproof ring interposed therebetween.

By the way, waterproof rings are formed of resins such as urethane resin, and are relatively weak against heat.

For this reason, in order to prevent a waterproof ring from being melted or deformed by the laser light L1, it is preferable that the waterproof ring be placed at a position as far apart from the welding part Wp to be irradiated with the laser light L1 as possible.

Also, a waterproof ring may be placed at a position deviated from an extension line of the radiation direction of the laser light L1 in order to suppress the influence of the laser light L1.

In the first embodiment, in the case of further disposing waterproof rings, it is possible to realize the case 1 having higher airtightness and higher waterproof performance.

Also, in the third embodiment, the example in which the inner periphery surface of the main case body 2 in the welding part Wp and the inner periphery surface of the exterior member 3 in the welding part Wp are almost flush with each other as shown in FIGS. 5A and 5B has been described. However, the configuration of the welding part Wp of the main case body 2 and the exterior member 3 is not limited thereto.

Figure 6A:
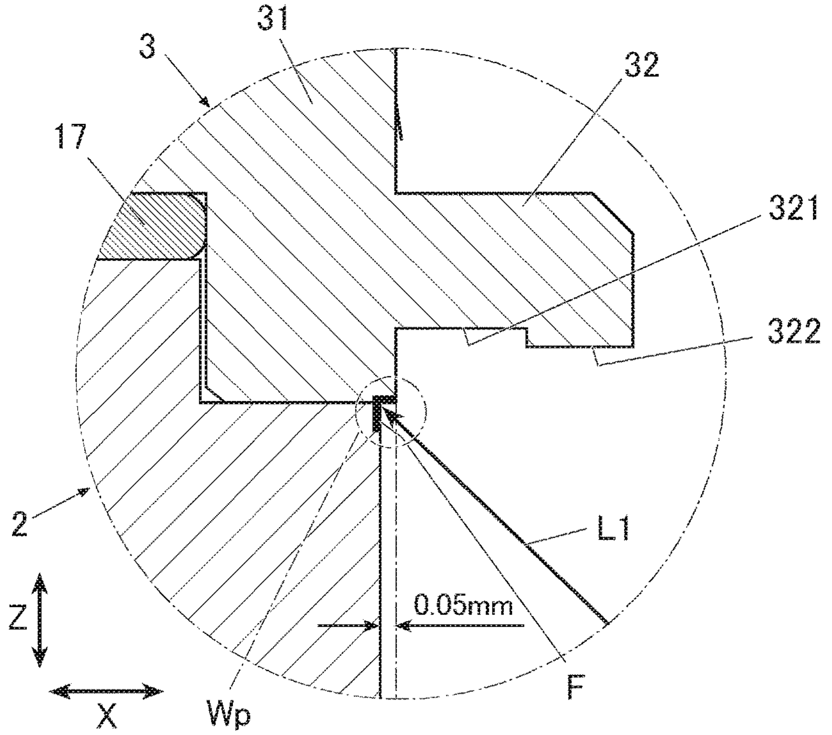
FIG. 6A is a cross-sectional view of a main part of a modification of the third embodiment.

For example, as shown in FIG. 6A, in the welding part Wp, the exterior member 3 may project inward from the main case body 2. In this case, specifically, the inside diameter of the exterior member 3 in the welding part Wp is set so as to be smaller than the inside diameter of the main case body 2 in the welding part Wp such that the inner periphery surface of the exterior member 3 in the welding part Wp protrudes slightly toward the inner side of the case 1 from the inner periphery surface of the main case body 2 in the welding part Wp.

FIG. 6A shows an example in which the inner periphery surface of the exterior member 3 in the welding part Wp has been formed so as to protrude toward the inner side of the case 1 from the inner periphery surface of the main case body 2 in the welding part Wp by 0.05 mm.

How much the inside diameter of the exterior member 3 in the welding part Wp is set to be smaller than the inside diameter of the main case body 2 in the welding part Wp needs only to be appropriately set. By the way, in general, the error allowable between components is about 0.05 mm, and if the tolerance for components is added thereto, it is about 0.075 mm. Therefore, it is preferable to set the difference in inside diameter to about 0.05 mm to 0.075 mm.

Figure 6B:
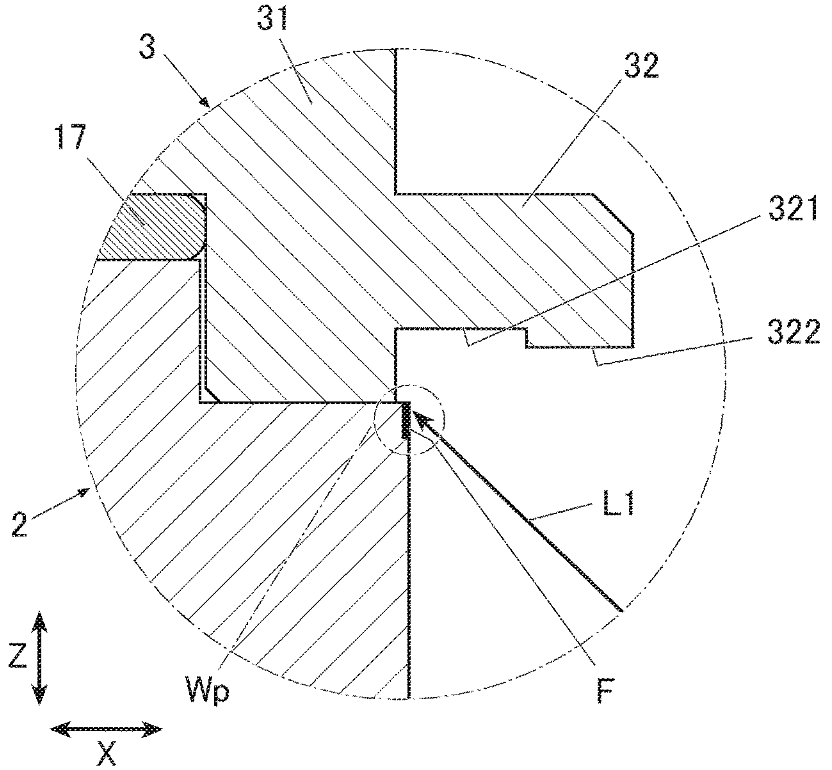
FIG. 6B is a cross-sectional view of a main part of an example of the case where a configuration contrary to that shown in FIG. 6A has been taken.

In the case of welding the welding part Wp of the main case body 2 and the exterior member 3 from the rear side of the case 1 with laser light like in the third embodiment, if the inner periphery surface of the main case body 2 in the welding part Wp protrudes inward from the inner periphery surface of the exterior member 3 in the welding part Wp, as shown in FIG. 6B, in the welding part Wp, the inner periphery surface of the main case body 2 is irradiated with the laser light L1, but the inner periphery surface of the exterior member 3 is not sufficiently irradiated with the laser light L1 since it is overshadowed by the protruding part of the main case body 2. For this reason, the part of the welding part Wp which is a part of the exterior member 3 does not melt much, so the main case body 2 and the exterior member 3 may not sufficiently adhere to each other.

For this point, in the case of forming the inner periphery surface of the exterior member 3 in the welding part Wp so as to protrude toward the inner side of the case 1 from the inner periphery surface of the main case body 2 in the welding part Wp as shown in FIG. 6A, it is possible to prevent a situation in which a part which is not irradiated with the laser light L1 occurs in the welding part Wp, and it is possible to make the main case body 2 and the exterior member 3 sufficiently adhere to each other.

Also, although the case where the case 1 is the case of the timepiece 100 has been described as an example in the present embodiment, the case 1 is not limited to the case where it is applied to a timepiece.

For example, the case 1 may be a case applicable to various devices which hold mechanical components and so on which need to be precisely positioned on flat surfaces inside cases, such as pedometers, heart rate measuring devices, altimeters, and barometers.

Although some embodiments of the present invention have been described above, the scope of the present invention is not limited to the above-described embodiments, and includes combinations of elements of the embodiments, and scopes equivalent to the scopes of the inventions disclosed in claims.

What is claimed is:

1. A method for manufacturing a case comprising:

a first step of placing an exterior member on an upper side of a main case body; and a second step of welding a welding part of the main case body and the exterior member from a rear side of the main case body with laser light such that the main case body and the exterior member adhere to each other, wherein:

an irradiation surface of the welding part to be irradiated with the laser light is oblique to a height direction of a column shape of the case that includes the main case body and the exterior member and perpendicular to the laser light that is incident on the irradiation surface; or the irradiation surface of the welding part is an almost vertical surface extending along the height direction of the column shape of the case that includes the main case body and the exterior member, the laser light is irradiated obliquely at a predetermined incidence angle with respect to the irradiation surface, and a reflected-light receiving part is formed at a position on which a reflected light from the irradiation surface arrives.

2. The method according to claim 1, wherein the first step includes bringing an inclined surface of the main case body that is slope to form a tapered shape being gradually wider upward into contact with an inclined surface of the exterior member.

3. The method according to claim 1, wherein the first step includes bringing an upper end surface of an inner periphery side of the main case body into contact with a lower end surface of the exterior member.

4. The method according to claim 2, wherein the first step includes bringing an upper end surface of an inner periphery side of the main case body into contact with a lower end surface of the exterior member.

5. The method according to claim 1, wherein the first step includes placing the exterior member on the upper side of the main case body with a waterproof ring interposed therebetween.

6. The method according to claim 2, wherein the first step includes placing the exterior member on the upper side of the main case body with a waterproof ring interposed therebetween.

7. The method according to claim 1, wherein the second step includes irradiating the laser light from a vicinity of a center part of the rear side of the main case body toward the welding part which is a surface to be an inner periphery surface of the case and at which the main case body and the exterior member need to be welded such that the main case body and the exterior member adhere to each other by melting a part of the welding part.

8. The method according to claim 2, wherein the second step includes irradiating the laser light from a vicinity of a center part of the rear side of the main case body toward the welding part which is a surface to be an inner periphery surface of the case and at which the main case body and the exterior member need to be welded such that the main case body and the exterior member adhere to each other by melting a part of the welding part.

9. The method according to claim 1, wherein the second step includes emitting a reflected light from the irradiation surface of the welding part toward a laser generating device which is a radiation source of the laser light almost in parallel with the laser light.

10. The method according to claim 2, wherein the second step includes emitting a reflected light from the irradiation surface of the welding part toward a laser generating device which is a radiation source of the laser light almost in parallel with the laser light.

11. The method according to claim 1, wherein the second step includes irradiating the reflected light from the irradiation surface of the welding part toward a lower surface of a flange part of the exterior member.

12. The method according to claim 2, wherein the second step includes irradiating the reflected light from the irradiation surface of the welding part toward a lower surface of a flange part of the exterior member.

13. The method according to claim 11, wherein the reflected light arrives the reflected-light receiving part which has a recess shape and is formed in the lower surface of the flange part.

14. The method according to claim 12, wherein the reflected light arrives the reflected-light receiving part which has a recess shape and is formed in the lower surface of the flange part.

15. A method for manufacturing a timepiece comprising:

a first step of placing an exterior member on an upper side of a main case body;

a second step of welding a welding part of the main case body and the exterior member from a rear side of the main case body with laser light such that the main case body and the exterior member adhere to each other; and a third step of disposing a module from the rear side of the main case body, wherein an irradiation surface of the welding part to be irradiated with the laser light is oblique to a height direction of a column shape of the case that includes the main case body and the exterior member and perpendicular to the laser light that is incident on the irradiation surface, or the irradiation surface of the welding part is an almost vertical surface extending along the height direction of the column shape of the case that includes the main case body and the exterior member, the laser light is irradiated obliquely at a predetermined incidence angle with respect to the irradiation surface, and a reflected-light receiving part is formed at a position on which a reflected light from the irradiation surface arrives.

16. The method according to claim 15, wherein the third step includes bringing an upper surface of the module into contact with a module receiving surface of the exterior member.

17. The method according to claim 15, further comprising:

a fourth step of attaching a back lid member to an opening part of the rear side of the main case body with a waterproof ring interposed therebetween.

18. The method according to claim 16, further comprising:

a fourth step of attaching a back lid member to an opening part of the rear side of the main case body with a waterproof ring interposed therebetween.

19. The method according to claim 15, further comprising:

a fifth step of attaching a windshield member to an opening part of a front side of the exterior member with a waterproof ring interposed therebetween.

20. The method according to claim 16, further comprising:

a fifth step of attaching a windshield member to an opening part of a front side of the exterior member with a waterproof ring interposed therebetween.

21. A method for manufacturing a case comprising:

a first step of placing an exterior member on an upper side of a main case body; and a second step of welding a welding part of the main case body and the exterior member from a rear side of the main case body with laser light such that the main case body and the exterior member adhere to each other, wherein an irradiation surface of the welding part is an almost vertical surface extending along a height direction of a column shape of the case that includes the main case body and the exterior member, and wherein in the second step, the laser light is irradiated obliquely at a predetermined incidence angle with respect to the irradiation surface, the reflected light from the irradiation surface is irradiated toward a lower surface of a flange part of the exterior member, and a reflected-light receiving part is formed at a position on which a reflected light from the irradiation surface arrives.

* * * * *